(12) United States Patent
Yao et al.

(10) Patent No.: US 6,250,733 B1
(45) Date of Patent: Jun. 26, 2001

(54) COLOR PRINTER HALFTONING METHOD

(75) Inventors: Meng Yao, Tigard; Stephen M. Kroon, Sherwood, both of OR (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/198,024

(22) Filed: Nov. 23, 1998

(51) Int. Cl.$^7$ ................................ B41J 2/205; B41J 2/21; H04N 1/56

(52) U.S. Cl. ................................ 347/15; 347/43; 358/1.9; 358/533

(58) Field of Search ................. 347/43, 15; 358/502, 358/518, 520, 521, 1.9, 534, 535, 536, 533; 399/181

(56) References Cited

U.S. PATENT DOCUMENTS

| | | | | |
|---|---|---|---|---|
| 4,631,548 | * | 12/1986 | Milbrandt | 347/15 |
| 4,860,026 | * | 8/1989 | Matsumoto et al. | 347/15 |
| 5,493,323 | | 2/1996 | Harrington | 347/251 |
| 5,657,137 | * | 8/1997 | Perumal, Jr. et al. | 347/43 X |
| 5,805,178 | | 9/1998 | Silverbrook | 347/15 |
| 5,887,124 | * | 3/1999 | Iwasaki et al. | 358/1.9 |
| 6,023,344 | * | 2/2000 | Yabe | 358/521 |

OTHER PUBLICATIONS

Color Stochastic Screening with Smoothness Enhancement, 1997 International Conference on Digital Printing Technologies, 4 pages.

* cited by examiner

*Primary Examiner*—David F. Yockey
(74) *Attorney, Agent, or Firm*—Philip T. Virga

(57) ABSTRACT

A method of operating a printing system that can print any of several different colors onto a point on a sheet of printer media. The method includes using a halftoning screen with a matrix of assorted threshold values, along with image data having a matrix of image data elements. For each data element and each color, a density value is determined to establish the amount of each color needed to produce the color associated with the original data element. Then a calculation determines which of the colors will be printed to the particular location. In a selected sequence of colors, density values of the colors are added one by one to generate a density sum that increases until it exceeds the threshold value. The last color added, which caused the sum to exceed the threshold, is then printed to the media sheet at a corresponding point. The system may employ a high frequency blue noise screen, and may operate to print droplets of more colors than the number of ink colors by printing secondary color dots formed of two or more different color ink, as well as single color dots.

2 Claims, 7 Drawing Sheets

BLANK SCREEN

10

| 184 | 11 | 224 | 51 | 252 | 17 | 114 | 241 | 128 | 79 | 22 | 140 | 57 | 215 | 160 | 49 |
|---|---|---|---|---|---|---|---|---|---|---|---|---|---|---|---|
| 236 | 69 | 133 | 107 | 170 | 70 | 196 | 38 | 155 | 191 | 228 | 90 | 185 | 104 | 27 | 86 |
| 115 | 163 | 40 | 209 | 2 | 142 | 96 | 220 | 73 | 119 | 55 | 162 | 13 | 254 | 141 | 208 |
| 8 | 187 | 244 | 81 | 183 | 238 | 29 | 171 | 12 | 246 | 35 | 205 | 126 | 43 | 177 | 61 |
| 145 | 101 | 23 | 154 | 116 | 52 | 137 | 201 | 103 | 147 | 181 | 85 | 230 | 76 | 111 | 239 |
| 44 | 217 | 63 | 229 | 32 | 210 | 92 | 59 | 225 | 66 | 123 | 9 | 151 | 212 | 16 | 194 |
| 82 | 122 | 178 | 132 | 74 | 172 | 253 | 5 | 165 | 42 | 240 | 199 | 98 | 50 | 130 | 159 |
| 30 | 251 | 3 | 202 | 106 | 18 | 143 | 113 | 197 | 138 | 78 | 33 | 175 | 247 | 65 | 222 |
| 169 | 88 | 152 | 46 | 237 | 189 | 67 | 219 | 25 | 105 | 214 | 156 | 121 | 4 | 186 | 109 |
| 203 | 53 | 221 | 124 | 77 | 158 | 39 | 95 | 168 | 245 | 14 | 68 | 233 | 93 | 148 | 20 |
| 97 | 136 | 15 | 176 | 34 | 213 | 135 | 234 | 45 | 87 | 146 | 193 | 37 | 207 | 48 | 243 |
| 60 | 232 | 192 | 94 | 250 | 108 | 0 | 190 | 125 | 206 | 58 | 112 | 164 | 83 | 131 | 179 |
| 1 | 157 | 72 | 26 | 153 | 54 | 166 | 75 | 21 | 161 | 226 | 10 | 255 | 24 | 223 | 117 |
| 91 | 211 | 127 | 235 | 118 | 200 | 227 | 100 | 248 | 47 | 134 | 182 | 99 | 149 | 56 | 195 |
| 249 | 62 | 19 | 180 | 41 | 84 | 28 | 144 | 188 | 110 | 71 | 36 | 204 | 80 | 174 | 31 |
| 102 | 150 | 198 | 89 | 139 | 216 | 173 | 64 | 6 | 218 | 167 | 242 | 120 | 7 | 231 | 129 |

*FIG. 1*

CYAN AT 10%
(0→25)

```
        C(10%)
t=  0    25 26                                              255
    12↗      10↘
```

| 184 | C 11 | 224 | 51 | 252 | C 17 | 114 | 241 | 128 | 79 | C 22 | 140 | 57 | 215 | 160 | 49 |
|---|---|---|---|---|---|---|---|---|---|---|---|---|---|---|---|
| 236 | 69 | 133 | 107 | 170 | 70 | 196 | 38 | 155 | 191 | 228 | 90 | 185 | 104 | 27 | 86 |
| 115 | 163 | 40 | 209 | C 2 | 142 | 96 | 220 | 73 | 119 | 55 | 162 | C 13 | 254 | 141 | 208 |
| C 8 | 187 | 244 | 81 | 183 | 238 | 29 | 171 | C 12 | 246 | 35 | 205 | 126 | 43 | 177 | 61 |
| 145 | 101 | C 23 | 154 | 116 | 52 | 137 | 201 | 103 | 147 | 181 | 85 | 230 | 76 | 111 | 239 |
| 44 | 217 | 63 | 229 | 32 | 210 | 92 | 59 | 225 | 66 | 123 | C 9 | 151 | 212 | C 16 | 194 |
| 82 | 122 | 178 | 132 | 74 | 172 | 253 | C 5 | 165 | 42 | 240 | 199 | 98 | 50 | 130 | 159 |
| 30 | 251 | C 3 | 202 | 106 | C 18 | 143 | 113 | 197 | 138 | 78 | 33 | 175 | 247 | 65 | 222 |
| 169 | 88 | 152 | 46 | 237 | 189 | 67 | 219 | C 25 | 105 | 214 | 156 | 121 | C 4 | 186 | 109 |
| 203 | 53 | 221 | 124 | 77 | 158 | 39 | 95 | 168 | 245 | C 14 | 68 | 233 | 93 | 148 | C 20 |
| 97 | 136 | C 15 | 176 | 34 | 213 | 135 | 234 | 45 | 87 | 146 | 193 | 37 | 207 | 48 | 243 |
| 60 | 232 | 192 | 94 | 250 | 108 | C 0 | 190 | 125 | 206 | 58 | 112 | 164 | 83 | 131 | 179 |
| C 1 | 157 | 72 | 26 | 153 | 54 | 166 | 75 | C 21 | 161 | 226 | C 10 | 255 | C 24 | 223 | 117 |
| 91 | 211 | 127 | 235 | 118 | 200 | 227 | 100 | 248 | 47 | 134 | 182 | 99 | 149 | 56 | 195 |
| 249 | 62 | C 19 | 180 | 41 | 84 | 28 | 144 | 188 | 110 | 71 | 36 | 204 | 80 | 174 | 31 |
| 102 | 150 | 198 | 89 | 139 | 216 | 173 | 64 | C 6 | 218 | 167 | 242 | 120 | C 7 | 231 | 129 |

*FIG. 2*

TWO COLORS

C(10%) ............... M(10%)
t= 0  25 26 ............... 229 255
         12                      230
    10

| 184 | C 11 | 224 | 51 | M 252 | C 17 | 114 | M 241 | 128 | 79 | C 22 | 140 | 57 | 215 | 160 | 49 |
|---|---|---|---|---|---|---|---|---|---|---|---|---|---|---|---|
| M 236 | 69 | 133 | 107 | 170 | 70 | 196 | 38 | 155 | 191 | 228 | 90 | 185 | 104 | 27 | 86 |
| 115 | 163 | 40 | 209 | C 2 | 142 | 96 | 220 | 73 | 119 | 55 | 162 | C 13 | M 254 | 141 | 208 |
| C 8 | 187 | M 244 | 81 | 183 | M 238 | 29 | 171 | C 12 | M 246 | 35 | 205 | 126 | 43 | 177 | 61 |
| 145 | 101 | C 23 | 154 | 116 | 52 | 137 | 201 | 103 | 147 | 181 | 85 | M 230 | 76 | 111 | M 239 |
| 44 | 217 | 63 | 229 | 32 | 210 | 92 | 59 | 225 | 66 | 123 | C 9 | 151 | 212 | C 16 | 194 |
| 82 | 122 | 178 | 132 | 74 | 172 | M 253 | C 5 | 165 | 42 | M 240 | 199 | 98 | 50 | 130 | 159 |
| 30 | M 251 | C 3 | 202 | 106 | C 18 | 143 | 113 | 197 | 138 | 78 | 33 | 175 | M 247 | 65 | 222 |
| 169 | 88 | 152 | 46 | M 237 | 189 | 67 | 219 | C 25 | 105 | 214 | 156 | 121 | C 4 | 186 | 109 |
| 203 | 53 | 221 | 124 | 77 | 158 | 39 | 95 | 168 | M 245 | C 14 | 68 | M 233 | 93 | 148 | C 20 |
| 97 | 136 | C 15 | 176 | 34 | 213 | 135 | M 234 | 45 | 87 | 146 | 193 | 37 | 207 | 48 | M 243 |
| 60 | M 232 | 192 | 94 | M 250 | 108 | C 0 | 190 | 125 | 206 | 58 | 112 | 164 | 83 | 131 | 179 |
| C 1 | 157 | 72 | 26 | 153 | 54 | 166 | 75 | C 21 | 161 | 226 | C 10 | M 255 | C 24 | 223 | 117 |
| 91 | 211 | 127 | M 235 | 118 | 200 | 227 | 100 | M 248 | 47 | 134 | 182 | 99 | 149 | 56 | 195 |
| M 249 | 62 | C 19 | 180 | 41 | 84 | 28 | 144 | 188 | 110 | 71 | 36 | 204 | 80 | 174 | 31 |
| 102 | 150 | 198 | 89 | 139 | 216 | 173 | 64 | C 6 | 218 | 167 | M 242 | 120 | C 7 | M 231 | 129 |

*FIG. 3*
PRIOR ART

8 PIXELS TO RIGHT

| 184 | C 11 | M 224 | 51 | 252 | C 17 | 114 | 241 | 128 | M 79 | C 22 | 140 | 57 | M 215 | 160 | 49 |
|---|---|---|---|---|---|---|---|---|---|---|---|---|---|---|---|
| 236 | 69 | 133 | 107 | 170 | 70 | 196 | 38 | 155 | 191 | 228 | 90 | 185 | 104 | 27 | 86 |
| 115 | 163 | 40 | 209 | CM 2 | 142 | 96 | 220 | 73 | 119 | 55 | 162 | CM 13 | 254 | 141 | 208 |
| CM 8 | 187 | 244 | 81 | 183 | 238 | 29 | 171 | CM 12 | 246 | 35 | 205 | 126 | 43 | 177 | 61 |
| 145 | 101 | C 23 | 154 | 116 | 52 | 137 | 201 | 103 | 147 | M 181 | 85 | 230 | 76 | 111 | 239 |
| 44 | 217 | 63 | M 229 | 32 | 210 | M 92 | 59 | 225 | 66 | 123 | C 9 | 151 | 212 | C 16 | 194 |
| 82 | 122 | 178 | 132 | 74 | 172 | 253 | C 5 | 165 | 42 | 240 | 199 | 98 | 50 | 130 | M 159 |
| 30 | 251 | C 3 | 202 | 106 | C 18 | 143 | 113 | 197 | 138 | M 78 | 33 | 175 | M 247 | 65 | 222 |
| M 169 | 88 | 152 | 46 | 237 | M 189 | 67 | 219 | C 25 | 105 | 214 | 156 | 121 | C 4 | 186 | 109 |
| 203 | 53 | M 221 | 124 | 77 | 158 | 39 | M 95 | 168 | 245 | C 14 | 68 | 233 | 93 | 148 | C 20 |
| 97 | 136 | C 15 | 176 | 34 | 213 | 135 | 234 | 45 | 87 | M 146 | 193 | 37 | 207 | 48 | 243 |
| 60 | 232 | 192 | 94 | 250 | 108 | C 0 | 190 | 125 | 206 | 58 | 112 | 164 | 83 | M 131 | 179 |
| CM 1 | 157 | 72 | M 26 | 153 | M 54 | 166 | 75 | CM 21 | 161 | 226 | C 10 | 255 | C 24 | 223 | 117 |
| 91 | 211 | 127 | 235 | 118 | 200 | 227 | 100 | 248 | 47 | 134 | 182 | 99 | 149 | 56 | 195 |
| 249 | 62 | C 19 | 180 | 41 | 84 | 28 | 144 | 188 | 110 | M 71 | 36 | 204 | 80 | 174 | 31 |
| M 102 | 150 | 198 | 89 | 139 | M 216 | 173 | 64 | C 6 | 218 | 167 | 242 | 120 | C 7 | 231 | 129 |

| C(10%) | M(10%) | | |
|---|---|---|---|
| t= 0  25 | 26  51 | 52 | 255 |

10

| 184 | C 11 | 224 | M 51 | 252 | C 17 | 114 | 241 | 128 | 79 | C 22 | 140 | 57 | 215 | 160 | M 49 |
|---|---|---|---|---|---|---|---|---|---|---|---|---|---|---|---|
| 236 | 69 | 133 | 107 | 170 | 70 | 196 | M 38 | 155 | 191 | 228 | 90 | 185 | 104 | M 27 | 86 |
| 115 | 163 | M 40 | 209 | C 2 | 142 | 96 | 220 | 73 | 119 | 55 | 162 | C 13 | 254 | 141 | 208 |
| C 8 | 187 | 244 | 81 | 183 | 238 | M 29 | 171 | C 12 | 246 | M 35 | 205 | 126 | M 43 | 177 | 61 |
| 145 | 101 | C 23 | 154 | 116 | 52 | 137 | 201 | 103 | 147 | 181 | 85 | 230 | 76 | 111 | 239 |
| M 44 | 217 | 63 | 229 | M 32 | 210 | 92 | 59 | 225 | 66 | 123 | C 9 | 151 | 212 | C 16 | 194 |
| 82 | 122 | 178 | 132 | 74 | 172 | 253 | C 5 | 165 | M 42 | 240 | 199 | 98 | M 50 | 130 | 159 |
| M 30 | 251 | C 3 | 202 | 106 | C 18 | 143 | 113 | 197 | 138 | 78 | M 33 | 175 | 247 | 65 | 222 |
| 169 | 88 | 152 | M 46 | 237 | 189 | 67 | 219 | C 25 | 105 | 214 | 156 | 121 | C 4 | 186 | 109 |
| 203 | 53 | 221 | 124 | 77 | 158 | M 39 | 95 | 168 | 245 | C 14 | 68 | 233 | 93 | 148 | C 20 |
| 97 | 136 | C 15 | 176 | M 34 | 213 | 135 | 234 | M 45 | 87 | 146 | 193 | M 37 | 207 | M 48 | 243 |
| 60 | 232 | 192 | 94 | 250 | 108 | C 0 | 190 | 125 | 206 | 58 | 112 | 164 | 83 | 131 | 179 |
| C 1 | 157 | 72 | M 26 | 153 | 54 | 166 | 75 | C 21 | 161 | 226 | C 10 | 255 | C 24 | 223 | 117 |
| 91 | 211 | 127 | 235 | 118 | 200 | 227 | 100 | 248 | M 47 | 134 | 182 | 99 | 149 | 56 | 195 |
| 249 | 62 | C 19 | 180 | M 41 | 84 | M 28 | 144 | 188 | 110 | 71 | M 36 | 204 | 80 | 174 | M 31 |
| 102 | 150 | 198 | 89 | 139 | 216 | 173 | 64 | C 6 | 218 | 167 | 242 | 120 | C 7 | 231 | 129 |

*FIG. 5*

COLOR PRINTER HALFTONING METHOD

BACKGROUND OF THE INVENTION

This invention relates generally to printing, and more particularly to a method for halftoning images including multiple colors and multi-level grayscale printing.

Printing with multiple colors or multiple shades of gray uses a halftoning process to convert continuous tone images to a printable format. For instance, 24 bit/pixel continuous tone image data may be converted into 3 or 4 bit/pixel print data. This allows the use of printing technology that imprints ink in fixed quanta (i.e. one or more droplets per pixel may be used.) With only a few actual colors being printable, the perception of a multitude of color tones is created by the combination of adjacent printed pixels.

Halftoning may employ a screen having a matrix of different threshold values. A screen is a data set with each different possible print density value equally represented (or with a controlled unequal distribution for gamma-compensated screens). For monochrome printing, the image data is compared with the screen thresholds at each position, and if the image data exceeds the threshold, a dot is printed; if not, the location remains unprinted. Improved appearance is provided using a pseudo-random stochastic screen having a "blue noise" characteristic. Such screens, as shown in FIG. 1, have the threshold values distributed so that adjacent values tend to be very different, and so that any value or limited range of values will tend to be located at positions that are nicely spaced apart on the matrix, avoid clumping. In this example, a 16-by-16 pixel screen having threshold values in the range of 0–255 is used. This apparently even-but-random spacing is particularly emphasized at the extremely low and high density values in a blue noise screen. For monochrome printing, an example is shown at FIG. 2, in which an even field of 10% cyan is printed, with cyan dots at all locations where the threshold values of the original screen are 25 or less, accounting for 10% of the printable locations.

For printing with multiple colors, halftoning presents a particular challenge. For dot-on-dot printing, in which printed locations are printed with one or more dots, a single halftoning screen is used. For instance, a field of 10% blue would have 10% of locations printed with cyan and magenta ink, while 90% of locations are unprinted. This has the disadvantage of reduced spatial frequency with respect to methods that distribute dots to different locations, and gives the appearance of darker dots, more widely spaced apart, or a "grainy" image. The same applies for clustered dot printing techniques, in which different color dots may be printed adjacent to each other or otherwise clustered to create a multi-dot cluster that reads as an intermediate color. Accordingly, it is preferable to print the individual dots at closely spaced separate (i.e. non-overlapping) locations, relying on the viewer's eye to integrate the different color dots into the intended color.

By using different screens having the threshold values arranged differently, the dots will tend not to align with each other. However, with uncorrelated screens, the printed patterns of different colors will tend to be randomly located with respect to each other, leading to some graininess of the image as some dots happen to clump near others or overlap. With two colors, to reduce this, an "inverted" screen is used for one of the colors, as shown in FIG. 3. An inverted screen has values equal to the maximum screen value, less the screen value at the corresponding location on the other screen. Thus, for the illustrated screen, 10% blue is printed by printing cyan dots at all locations where the threshold values of the original screen are 25 or less, and magenta dots are printed at locations of values of 230 and above on the original screen (25 or less on an inverted screen). Inverted screens are limited in usefulness for several reasons.

First, inverted screens may only be used for two colors, which is inadequate for most multiple color printing systems. Where image quality is not critical in three color (CMY-cyan, magenta, yellow) systems, the darker C and M dots may be printed in this way, while the less visible yellow dots may be distributed otherwise. For four-color systems employing black ink and for multi-level grayscale printing, the inverted screen is inadequate to provide desired image quality. Second, even for two color systems, where (for the illustrated 10% blue example) one color is printed at the lowest value range positions, and another is printed at the highest value range positions, those positions are not relatively well dispersed with respect to each other in a blue noise screen. Although it will not generate overlapping droplets at less than full coverage printing, a high frequency blue noise screen will lead to clumps of adjacent dots, as shown in FIG. 3. Beyond the random effects leading to such clumping, widely different values are more likely to be adjacent to each other.

For three and four color systems, a shifted screen approach has been employed to avoid pure dot-on-dot printing for some colors. This can lead to increased graininess of the image, but more often generates unwanted low frequency artifacts that are visible in the printed image. It is also believed possible that moiré patterns may be generated. As illustrated in FIG. 4, the example screen has been used for printing cyan droplets in a 10% blue (10% c, 10% m) pattern. The same screen has been shifted by 8 pixels to the right for locating the magenta droplets (shifted screen not shown), each of which are located 8 pixels to the right of a corresponding cyan droplet. This leads to several visible incidents of droplet overlap, and an unevenly spaced pattern, is causing a grainy appearance.

Accordingly, there is a need for a halftoning process for printing systems employing three or more colors, including multiple shades of gray, that provides an evenly dispersed pattern of individual drops of different colors, and in which the droplets are evenly dispersed relative to all droplets, and not just to those of their own color. In addition, there is a need for a system for evenly distributing color ink droplets when a high density image has greater than full coverage, i.e. when all locations are printed, and at least some are printed by at least two different colors. For such high density printing requirements, the locations with second droplets of each color should be nicely distributed in an even but random appearing manner, without bias toward overlapping a particular color or colors.

The present invention overcomes these disadvantages by providing a method of operating a color printing system that can print any of several different colors, including different shades of gray, on a sheet of printer media on a sheet of printer media.

SUMMARY OF THE INVENTION

It is an aspect of the present invention that the method of operating a printing system using multiple colors or multiple levels of gray includes using a halftone screen with a matrix of assorted threshold values, along with image data having a matrix of image data elements.

It is a feature of the present invention that for each data element and each color or gray level, a density value is determined to establish the amount of each color or gray level needed to produce the color associated with the original data element and then a thresholding process determines which of the colors or gray levels will be printed to the particular location.

It is another feature of the present invention that in a selected sequence of colors or gray levels density values of the colors or gray levels are added one by one to generate a density sum that increases until it exceeds the threshold value and the last color or gray level added, which caused the sum to exceed the threshold, is then printed to the media sheet at a corresponding point.

It is yet another feature of the present invention that the system may employ a high frequency blue noise screen, and may operate to print droplets of more colors or gray levels than the number of ink colors or gray levels by printing color dots formed of two or more different color inks or gray levels, as well as single color dots.

It is an advantage of the present invention that less grainy halftone images are obtained by replacing denser ink drop masses with lighter ink drop masses in non-overlapping printing.

It is another advantage of the present invention that non-overlapping ink dots increase the spatial frequency of the printed dots thereby avoiding the sensitive low frequency range of the human eye which makes dots less visible.

BRIEF DESCRIPTION OF THE DRAWINGS

These and other aspects, features and advantages of the invention will become apparent upon consideration of the following detailed disclosure of the invention, especially when it is taken in conjunction with the accompanying drawings wherein:

FIG. 1 is a symbolic view of a halftone screen according to a preferred embodiment of the invention.

FIG. 2 is a symbolic view of monochromatic printing employing the screen of FIG. 1.

FIG. 3 is a symbolic view of two color printing employing the screen of FIG. 1 using a prior art method.

FIG. 4 is a symbolic view of two color printing employing the screen of FIG. 1 using a different prior art method.

FIG. 5 is a symbolic view of two color printing employing the screen of FIG. 1 using a method according to a preferred embodiment of the invention.

DETAILED DESCRIPTION OF THE PREFERRED EMBODIMENT

Figure 6:
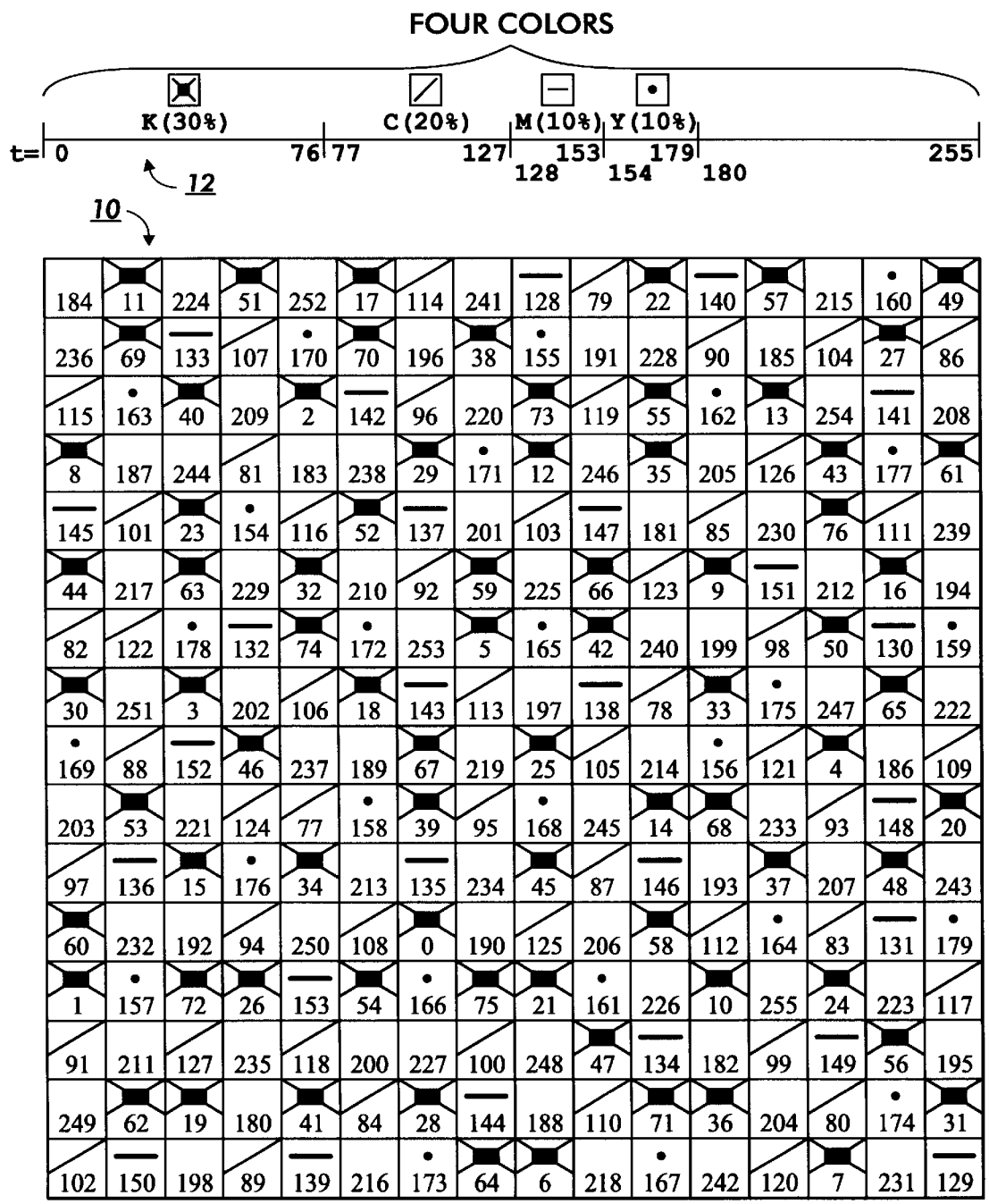
FIG. 6 is a symbolic view of four color printing employing the screen of FIG. 1 using a method according to a preferred embodiment of the invention.

FIG. 1 shows a blue noise stochastic halftone screen 10 in symbolic form as a grid having assorted numerical threshold values. In practice, the screen is stored as a set of data in a memory device of a printer or a computer connected to a printer. The screen is a 16-by-16 element matrix having one of each value from 0 through 255. In the preferred embodiment, a larger screen of 128-by-128 elements is used to reduce the possibility that screen-generated patterns will appear visible, generating an unwanted tiling effect. In those stochastic screens that have not been gamma-compensated, each value in the entire range is represented as often as each of the other values, so that a randomly selected location on the matrix is equally likely to be any of the threshold values. However, the values are not entirely random. With a blue noise screen, values are carefully distributed to reduce the chances that numerically close values will appear at spatially close locations on the screen. Put another way, a limited range of values (dots) will tend to be widely distributed about the screen, with fairly even but not regular spacing between adjacent dots.

FIG. 2 shows an example of monochrome printing using the screen 10. In this example, cyan ink is printed to a density of 10% across the entire field. Ink droplets of any colorant are printed to 10% of locations on a matrix of possible locations on a sheet of printer media, with the media locations corresponding to the screen matrix. A distribution spectrum graph 12 shows how the locations are determined. The axis of the graph represents the possible range of threshold values "t" (0–255, for example) for a given pixel. The maximum threshold value will vary depending upon the printer used. The bar above a portion of the axis indicates the color of the ink to be printed, and its length indicates the percentage print density value for that color. The position of the bar along the line indicates which threshold values shall be printed with droplets of that color ink.

In the example, for the given color (10% cyan), ink will be printed at screen locations having values of 0–25. Locations having threshold values of 26–255 are not printed. Essentially, the bar chart indicates printing rules for a selected apparent color (10% cyan), and will apply to as many pixels as are logically assigned that color in the image data. This may be a single pixel, a large field of contiguous pixels (as shown) or diverse and distributed pixels in a full color image. Where the selected color appears, the threshold value at the corresponding location serves as the guide of whether to print a dot (since dots can not be printed in varying intensities to reflect the density value in the printing data.) It is the probabilistic effect that generates the appearance of the selected intensity.

Owing to the distribution of the screen threshold values (which were generated independently of the selected print data examples) the printed dots will be "nicely" spaced apart in a random manner, with spacings between dots being similar, leaving no clusters of dots, nor large holes in which dots are noticeably absent.

To add a second color, a prior art approach uses an inverted screen, as shown in FIG. 3. In the example, 10% blue is generated by printing 10% cyan and 10% magenta. The cyan dots are assigned to locations as above, using the same screen. The magenta dots are assigned to locations at the top range of screen values, over a range equal to the desired density of that ink color. This is achieved by generating an inverted screen (not shown) having a value at each location of the maximum screen value (255) minus the value of the first screen at the corresponding location on the first screen, and printing only when the density of the second color is above the inverted screen threshold value (i.e. it falls in the top 10% range in the complementary original screen value). This avoids assigning dots to common locations when the total print density of the colors is less than 100% (no overlapping drops required). However, as shown, the output for what should be an even field is somewhat irregular appearing, with many clusters of adjacent droplets, and several "holes" where droplets are absent.

To add a third color, the inverted screen may not be used without reverting to the disadvantages of dot-on-dot printing. Thus, a shifted screen has been used in the prior art. FIG. 4 illustrates a prior art approach with a shifted screen using two colors, for simplicity. To print 10% blue, as in the above example, 10% cyan and 10% magenta are required. The cyan drops are printed as in FIG. 2. For the magenta color, the cyan screen is shifted in one direction by a selected number of pixels, in this case 8 pixels to the right. As discussed above, this yields an uneven distribution of magenta dots relative to cyan dots, including several instances of overlapping dots. In addition, in large fields, and with certain print densities related to the shift increment, unwanted low frequency patterns may be generated.

FIG. 5 shows the printing approach of a preferred embodiment of the invention, using the above 10% blue example for clarity, but which may be applied to an unlimited number of colors, including colors generated by overlaying combinations of drops printed to a single location. In this approach, the ink colors are printed in proportion to their values in the resulting desired color for a pixel or set of pixels, with the first color being printed if the threshold value is in a lowest range having a range proportionate to the percentage value of the first ink color, and the second color being printed if the threshold value is in a contiguous and higher range having a range proportionate to the percentage value of the second ink color.

In the simple example, the first 10% of threshold values (0–25) are printed with cyan, and the next 10% (26–51) are printed with magenta, while the remainder (52–255) are unprinted. As noted above, this example shows a large uniform field of a single color, represented by the scattered droplets of different colors. In the case of a single pixel, the questions of whether any color is printed, and if so which color, are determined probabilistically, relying on the pseudo-randomness of the screen to achieve an overall pleasing result. If the threshold value is in a range corresponding to either ink color bar in the linear graph 12, that color is printed. If not, none is printed.

An example of four color printing is shown in FIG. 6. Here, the ink colors have been calculated as required to produce a desired cool gray color. The colors are arranged in a selected hierarchy from darkest to lightest, from most visible to least, or in a similar pattern that at least approximately puts the highest contrast (with respect to printer media) color such as black first, and the lowest contrast color such as yellow last. In this example, the order is black, cyan, magenta, and yellow (k, c, m, y); cyan and magenta may be switched in the sequence in other embodiments without materially affecting the desired result. The colors are represented by symbols as shown above the linear graph 12. Other ink chemistries and printing systems may use different colors, or different hierarchies. The first ink color, black, is required at 30% density, and is printed to those locations where the resulting gray color is desired when the threshold values at those locations are in the first 30% of threshold values, or 0–76. The next color, cyan, is required at 20% density, and is printed to locations where the threshold values are in the next 20% of threshold values. The next color, magenta, is required at 10% density, and is printed to locations where the is threshold values are in the next 10% of threshold values. The next color, yellow, is required at 10% density, and is printed to locations where the threshold values are in the next 10% of threshold values.

The darkest or most visible color is assigned to the first range of values, because blue-noise screens provide the best distribution of values at the extreme values, with less ideal distribution at intermediate values. It is desirable that the most visible color be given this preferred treatment. For instance, a muted light yellow color to be printed might be generated by 45% yellow and 10% black. If black is assigned the first 10% of locations, it will be evenly distributed. On the other hand, if it were assigned values in the range of 45–55% of the threshold values, slight graininess might be more visible. The yellow drops are more difficult to resolve due to their low contrast with respect to the printer media, and such slight graininess is much less noticeable. In the example of FIG. 6, the black droplets are well distributed with respect to each other, thereby avoiding the most noticeable source of graininess.

Figure 7:
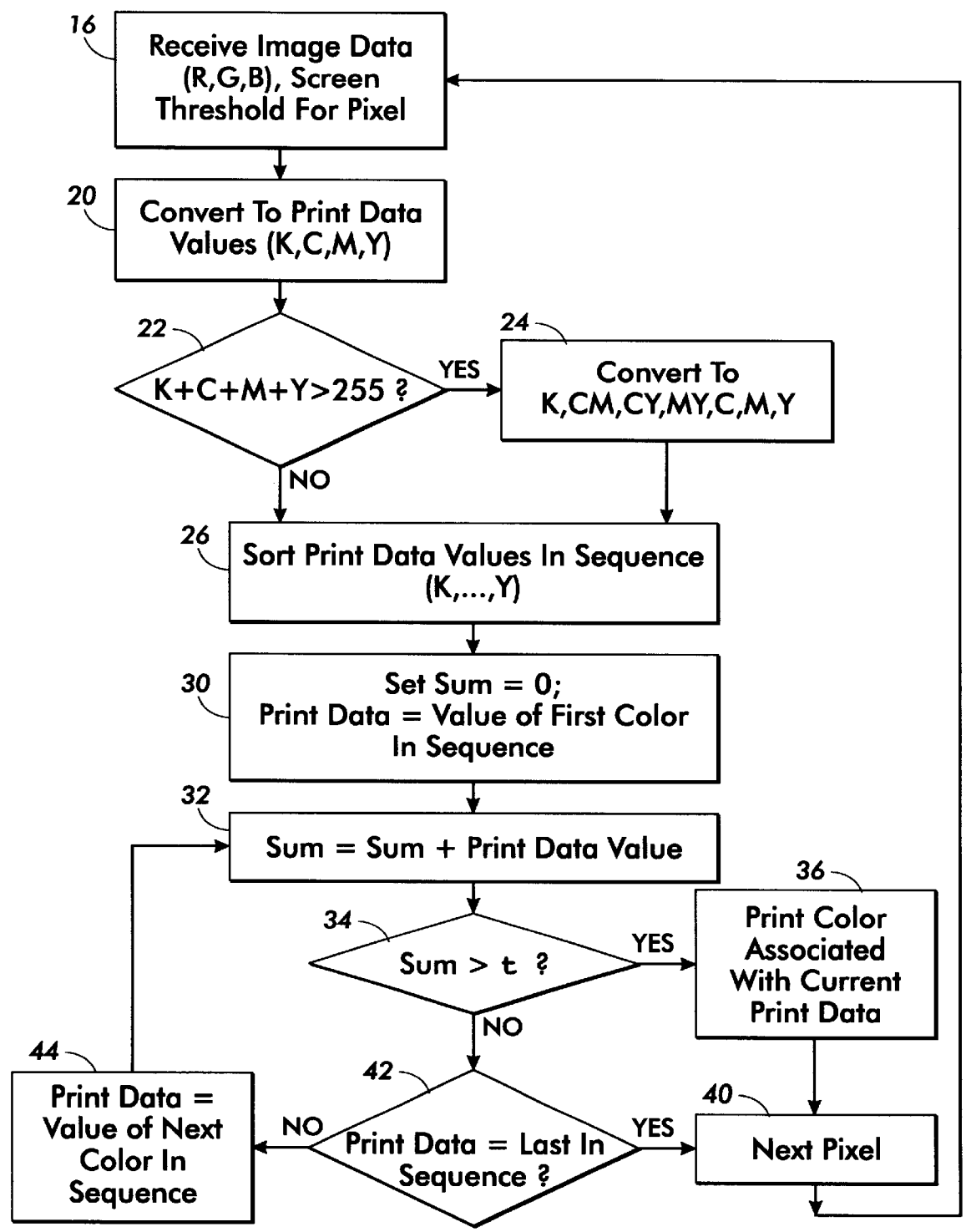
FIG. 7 is a flow chart illustrating a method of operation according to a preferred embodiment of the invention.

FIG. 7 is a flow chart illustrating the operation of the preferred embodiment, and is discussed below in greater mathematical detail. The entire chart indicates the calculations required for a given pixel. In step 16, the printer or computer processor receives full color image data, typically 24 bit/pixel RGB data, and the threshold value from the screen for the current pixel. The image data is converted to useful print data (k, c, m, y) in step 20, with each value being the percentage of that color needed to generate the desired image color in a large field, multiplied by the number of possible threshold values in the screen. In an alternative embodiment, the conversion for a given color in the image data may be made once, and stored in a memory location to be retrieved when or if that color arises again in another pixel of the image. For multi-level grayscale printing the same methodology is followed, substituting the darkest to lightest grayscale colors for the black, cyan, magenta and yellow colors. It is also possible to use a lightest to darkest hierarchy.

In step 22, the processor determines if k+c+m+y exceeds 255 (or whatever happens to be the highest screen value). If so, more than full coverage is required, and some overlapping droplets will be needed. In this case, in step 24, the print data is converted to black, blue (cm), green (cy), red (my), c, m, and y, values. Although only the four primary ink colors are printed by the printer, the secondary colors are provided by printing overlaying droplets of the primary ink colors, and serve as "virtual" ink colors. This conversion process is discussed below in a separate section. After such conversion to provide print data density values for each primary and secondary ink color, or after it has been determined in step 22 that the print data requires less than full coverage (no overlap needed), the sequence of operations proceeds. The print data values are sorted in step 26 approximately from darkest to lightest, or in a sequence as noted above. This sequence is k, c, m, y for less than full coverage, and k, cm, cy, my, c, m, y for more than full coverage (in a case where two droplets per pixel is the tolerated maximum.)

In step 30, a "sum" value is initialized to zero, and a "printdata" value is set to the value of the first color in the hierarchy or sequence. In step 32, the sum is increased by the amount of printdata for the current color. Then, in step 34, the sum is compared with the threshold value "t" at the current pixel. If the sum exceeds t, then the current, first color (black) is printed to the location on the printer media, as indicated at step 36, and processing of the next pixel begins at step 40, returning to step 16 for the next pixel.

If the sum is less than or equal to t, then the controller determines whether the print data is the last in the sequence in step 42. For all but the final (yellow) color, the process recycles, with the printdata value being set to the value of the next ink color at step 44, and the sum being incremented by that amount at step 32. The cycle proceeds until the addition of a certain color's printdata value causes the sum to exceed t, in which case that certain color is printed to the selected location. If no color causes the sum to exceed the threshold (such as when the threshold happens to be relatively high, and/or when the sum of all values is relatively low), the location is left unprinted.

For images larger than the halftone screen, as is typical, the halftone screen is tiled on a repeating matrix to adequately cover the image.

Mathematical Analysis of Process

In the case of less than full coverage ($k+c+m+y<255$), if the screen threshold value is between 0 and k (the length of the black segment of the linear graph, or the printdata value of black), then a black dot is placed; if the screen value is between k and k+c (the cyan segment), then a cyan dot is placed, etc. To be more specific, when the summation of c, m, y, k is less than 255, halftoning is done as follows:

| | |
|---|---|
| if $k > t$ | black dot is on |
| else if $k <= t < k + c$ | cyan dot is on |
| else if $k + c <= t < k + c + m$ | magenta dot is on |
| else if $k + c + m <= t < k + c + m + y$ | yellow dot is on |
| else | no dot is on (white) | where t is the corresponding screen value at the pixel to be halftoned.

When the summation of c, m, y, k is greater than 255, overlapping of dots will occur and is required. It is necessary to calculate the amounts of c, m, y, k, cm, cy, my to be used for the current pixel. Two basic rules apply. First, full coverage should be achieved so that no pixels are blank while others are double printed. Second, color balance should be maintained, so that the locations and colors that are overlapped are assigned in a way that does not generate distorted colors, such as may occur in crude systems where the end of sequence colors are simply applied to the low threshold value locations until they have been printed. Based on these two rules, full coverage is first achieved by laying down fractions of the c, m, y, k dots:

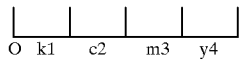

where each segment of the linear graph above is proportionate in length to the relative value of the ink color indicated. The values of each are calculated as follows;

$k1=k*255/(k+c+m+y)$ $c2=c*255/(k+c+m+y)$ $m3=m*255/(k+c+m+y)$ $y4=y*255/(k+c+m+y)$

The subscript is used to indicate the segment and the segments are dictated by k1, c2, m3 and y4 respectively.

The remaining dots for any one color are placed on top of dots of other colors in appropriate proportions as shown below.

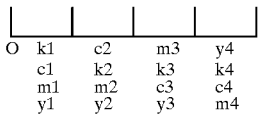

The remaining black dots ($k-k1$) will be placed at segments of c2, m3, y4 in these proportions:

$k2=c2* (k-k1)/(c2+m3+y4)$ $k3=m3* (k-k1)/(c2+m3+y4)$ $k4=y4* (k-k1)/(c2+m3+y4)$

Similarly, remaining cyan dots will be placed at segments of k1, m3, y4 in these proportions:

$c1=k1* (c-c2)/(k1+m3+y4)$ $c3=m3* (c-c2)/(k1+m3+y4)$ $c4=y4* (c-c2)/(k1+m3+y4)$

Remaining magenta dots are placed at segments of k1, c2, y4 in these proportions:

$m1=k1* (m-m3)/(k1+c2+y4)$ $m2=c2*(m-m3)/(k1+c2+y4)$ $m4=y4*(m-m3)/(k1+c2+y4)$

Remaining yellow dots are placed at segments of k1, c2, m3 in these proportions:

$y1=k1* (y-y4)/(k1+c2+m3)$ $y2=c2* (y-y4)/(k1+c2+m3)$ $y3=m3* (y-y4)/(k1+c2+m3)$

The first round of dots added (k1, c2, m3, y4) are the proportionately dominant dots in their respective segments. For example, in the c2 segment, the number of cyan dots is larger than that of black or magenta or yellow dots, that is, $c2>=k2$, $c2>=m2$, $c2>=y2$.

If, as is preferred in certain solid ink printers, non-black dots are not permitted to be printed with black dots at the same locations (to avoid putting too may layers of ink on the receiving substrate on which the image is printed,) then

| | |
|---|---|
| k1 = k1 + k2 + k3 + k4 = k | c2 = c2 − k2 |
| m3 = m3 − k3 | y4 = y4 − k4 |
| if (m2 > k2), then m2 = m2 − k2; | else m2 = 0 |
| if (y2 > k2), then y2 = y2 − k2; | else y2 = 0 |
| if (c3 > k3), then c3 = c3 − k3; | else c3 = 0 |
| if (y3 > k3), then y3 = y3 − k3; | else y3 = 0 |
| if (c4 > k4), then c4 = c4 − k4; | else c4 = 0 |
| if (m4 > k4), then m4 = m4 − k4; | else m4 = 0 |

Furthermore, in the preferred embodiment any cmy results (c, m and y overlapping) may optionally be replaced with k. The amounts of k, cm (c and m overlapping), cy (c and y overlapping), my (m and y overlapping), c, m, y are calculated as follows:

$bk=k1+min(m2, y2)+min(c3, y3)+min(c4, m4)$ $c=c2-max(m2, y2)$ $m=m3-max(c3, y3)$ $y=y4-max(c4, m4)$ $cm=m2-min(m2, y2)+c3-min(c3, y3)$ $cy=y2-min(m2, y2)+c4-min(c4, m4)$ $my=y3-min(c3, y3)+m4-min(c4, m4)$ where min(x,y) represents the lesser of the two values, and max(x,y) represents the greater.

After we obtain the amounts of different colors for the pixel, halftoning can be done according to the assignment below, although the order of the colors can be different.

```
|____|____|____|____|____|____|____|
0   bk   cm   cy   my   c    m    y  255 if bk > t                            black dot is on
else if bk + cm > t                  c, m dots are on
else if bk + cm + cy > t             c, y dots are on
else if bk + cm + cy + my > t        m, y dots are on
else if bk + cm + cy + my + c > t    c dot is on
else if bk + cm + cy + my + c + m > t    m dot is on
else    y dot is on.
```

In alternative embodiments, any threshold array may be used in a similar way in place of a blue noise screen. Also, other methods of placing pixels beyond full coverage are possible as long as color balance is maintained, for example, placing maximum secondaries (minimum black), etc. There are many imaginable ways to modify this technique for a specific device. The general concept is that under the constraint of maintaining color balance dot patterns of one color are dependent on dot patterns of other colors and the halftoning of a color image using a halftone screen is treated as a vector approach instead of a scalar approach.

While the invention has been described above with references to specific embodiments thereof, it is apparent that many changes, modifications and variations in the materials, arrangements of parts and steps can be made without departing from the inventive concept disclosed herein. Accordingly, the spirit and broad scope of the appended claims is intended to embrace all such changes, modifications and variations that may occur to one of skill in the art upon a reading of the disclosure. For example, although the halftoning method has been described in terms of cyan, magenta, yellow and blank inks, it is to be noted that it can be equally well practiced with more than four colors or with different shades of black inks printed with a clear ink, as is utilized in medical diagnostic imaging, or other grayscale imaging applications with or without a clear ink. The black inks can be a light black ink, a medium black ink and a dark black ink to achieve multi-level grayscale printing. The method can also be equally well used in ink jet and electrophotographic printing applications. All patent applications, patents and other publications cited herein are incorporated by reference in their entirety.

Having thus described the invention, what is claimed is:

1. A method of using a number of color inks to print on media using a halftone screen, where each ink can be deposited in an amount from 0% to 100%, comprising the steps of:

adding the percentage of all of the inks to produce a total ink percentage, if the total ink percentage is between 100% and 200%, a) divide 100% by the total ink percentage to generate a first layer number which is then multiplied by all individual ink percentages to result in amounts of each ink to use for a first layer of ink, and b) apply from the total ink percentage the remaining ink to a second layer of ink in a process where no ink of the second layer is deposited over ink on the first layer of the same color.

2. The method of claim 1 wherein, in the first layer, a more dense color ink is assigned to screen locations having lower threshold values.

* * * * *